United States Patent
Ishigaki

(10) Patent No.: US 11,865,987 B2
(45) Date of Patent: Jan. 9, 2024

(54) OCCUPANT PROTECTION DEVICE

(71) Applicant: Autoliv Development AB, Vargarda (SE)

(72) Inventor: Ryota Ishigaki, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 17/995,036

(22) PCT Filed: Mar. 25, 2021

(86) PCT No.: PCT/JP2021/012521
§ 371 (c)(1),
(2) Date: Sep. 29, 2022

(87) PCT Pub. No.: WO2021/200535
PCT Pub. Date: Oct. 7, 2021

(65) Prior Publication Data
US 2023/0131869 A1    Apr. 27, 2023

(30) Foreign Application Priority Data
Apr. 1, 2020 (JP) ................... 2020-065721

(51) Int. Cl.
*B60R 21/207* (2006.01)
*B60R 21/2165* (2011.01)
(Continued)

(52) U.S. Cl.
CPC .......... *B60R 21/207* (2013.01); *B60R 21/201* (2013.01); *B60R 21/2165* (2013.01);
(Continued)

(58) Field of Classification Search
CPC . B60R 21/207; B60R 21/215; B60R 21/2165; B60R 21/237; B60R 21/26;
(Continued)

(56) References Cited

U.S. PATENT DOCUMENTS 4,629,248 A * 12/1986 Mawbey .................. B60N 2/62
297/284.11
7,878,589 B2 * 2/2011 Murakami ............ B60R 21/207
297/284.11
(Continued)

FOREIGN PATENT DOCUMENTS

| DE | 20301516 U1 * | 7/2003 | ......... B60N 2/42718 |
| EP | 2022685 A2 * | 2/2009 | ........... B60R 21/207 |
| JP | 2004-009799 A | 1/2004 | |
| JP | 2004338514 A * | 12/2004 | |
| JP | 2005-306252 A | 11/2005 | |

(Continued)

*Primary Examiner* — Keith J Frisby
(74) *Attorney, Agent, or Firm* — Foley & Lardner LLP

(57) ABSTRACT

An occupant protecting device provided inside or below a seat cushion of a vehicle seat, including an airbag cushion, an inflator, and a cover that covers at least a portion of the airbag cushion and is capable of being cleaved opened by the expansion and deployment of the airbag cushion. The airbag cushion has front and rear attaching points attached to the vehicle seat side as well as an expanding and deploying part that at least expands and deploys between the front and rear attaching points. The cover has a weak portion that serves as a starting point when cleaved open by expansion and deployment of the airbag cushion and is arranged on a rearward side. The cover covers the front attaching points side of the expanding and deploying part and is attached to the vehicle seat on the front attaching points side.

20 Claims, 13 Drawing Sheets

(51) Int. Cl.
    *B60R 21/237*     (2006.01)
    *B60R 21/201*     (2011.01)
    *B60R 21/26*      (2011.01)
    *B60N 2/42*       (2006.01)
    *B60R 21/16*      (2006.01)

(52) U.S. Cl.
    CPC ............ *B60R 21/237* (2013.01); *B60R 21/26* (2013.01); *B60N 2/42* (2013.01); *B60R 2021/161* (2013.01)

(58) Field of Classification Search
    CPC . B60R 21/231; B60R 21/201; B60R 21/2342; B60R 2021/161; B60N 2/42; B60N 2/42754; B60N 2/42763; B60N 2/42718
    USPC ............. 280/728.2, 730.1, 743.1; 296/216.1, 296/284.11
    See application file for complete search history.

(56) References Cited

U.S. PATENT DOCUMENTS

2020/0307492 A1*   10/2020   Iida ..................... B60R 21/237
2020/0391686 A1*   12/2020   Ohno ..................... B60N 2/62
2023/0012314 A1*    1/2023   Matsushita ........... B60R 21/207

FOREIGN PATENT DOCUMENTS

| | | | |
|---|---|---|---|
| JP | 2006-069520 A | | 3/2006 |
| JP | 2006143002 A | * | 6/2006 |
| JP | 2007-118820 A | | 5/2007 |
| JP | 2007-283955 A | | 11/2007 |
| JP | 2007-320389 A | | 12/2007 |
| JP | 2007331445 A | * | 12/2007 |
| JP | 2009-143283 A | | 7/2009 |
| JP | 2010-052535 A | | 3/2010 |
| JP | 2019-084894 A | | 6/2019 |

* cited by examiner

OCCUPANT PROTECTION DEVICE

TECHNICAL FIELD

The present invention relates to an occupant protecting device provided inside or below a seat cushion of a vehicle seat.

BACKGROUND ART

In the event of a vehicle frontal collision, an occupant will move forward due to inertia. Patent Document 1 describes an occupant protecting device which, in the event of such a frontal collision, raises a front end portion of a seat cushion by instantaneously expanding an airbag in a vehicle seat, thereby suppressing forward movement of the waist of an occupant.

PRIOR ART DOCUMENTS

Patent Documents

Patent Document 1: Japanese Unexamined Patent Application 2007-118820

SUMMARY OF THE INVENTION

Problem to be Solved by the Invention

In Patent Document 1, a knee of an occupant is pushed up by the front end portion of the seat cushion when the airbag is expanded. However, based on the relationship to an attachment mode and arrangement position of the airbag with regard to the vehicle seat, the knee of the occupant is not sufficiently lifted. In order to effectively lift the knee of an occupant, the vicinity of the thigh near the buttocks of the occupant is preferably pushed up to lift up a portion from the thigh of the occupant to the knee as a whole, rather than pushing up only the knee of the occupant as in Patent Document 1.

An object of the present invention is to provide an occupant protecting device that contributes to improving the waist restraining performance of an occupant.

Means to Solve the Problem

The occupant protecting device according to an aspect of the present invention is an occupant protecting device provided inside or below a seat cushion of a vehicle seat, including: an airbag cushion capable of expanding and deploying to push up a seat surface of the seat cushion; an inflator that supplies gas for expansion and deployment into the airbag cushion in the event of a vehicle emergency; and a cover that covers at least a portion of the airbag cushion and is capable of being cleaved open by the expansion and deployment of the airbag cushion; wherein the airbag cushion has at least one first attaching point attached to the vehicle seat side, at least one second attaching point attached to the vehicle seat side on a rearward side of the first attaching point in a front-rear direction of the vehicle seat, and an expanding and deploying part that at least expands and deploys between the at least one first attaching point and the at least one second attaching point due to gas from the inflator, the cover has a weak portion that serves as a starting point for when the airbag cushion is cleaved open by the expansion and deployment of the airbag cushion, and the cover covers a side of the at least one first attaching point of the expanding and deploying part, such that the weak portion is positioned on a rearward side in the front-rear direction, and is attached to the vehicle seat on the side of the at least one first attaching point.

According to this aspect, in the process of expansion and deployment of the expanding and deploying part of the airbag cushion in the event of a vehicle emergency, the cover can direct (orient, guide) an expansion and deployment direction of the expanding and deploying part. Specifically, the cover covers the side of the first attaching point of the expanding and deploying part and the weak portion of the cover is positioned on the rearward side in the front-rear direction. Therefore, in an initial stage of expansion and deployment, the weak portion is cleaved open by the expansion and deployment of the expanding and deploying part and a portion on the side of the second attaching point (i.e. rearward side) is in an open state. On the other hand, at this time, another portion of the cover still covers the portion on the side of the first attaching point (i.e., forward side) of the expanding and deploying part, and therefore, expansion and deployment of the portion on the side of the first attaching point of the expanding and deploying part is suppressed more than that of the portion on the side of the second attaching point. In other words, in the initial stage of expansion and deployment, the portion on the side of the second attaching point of the expanding and deploying part is expanded and deployed prior to the portion on the side of the first attaching point of the expanding and deploying part. Thus, the rearward side of the expanding and deploying part expands and deploys upward to a greater extent than the forward side thereof when the subsequent expansion and deployment progresses, and therefore, enables the seat surface of the seat cushion to be pushed up higher from the rearward side than in a configuration without the cover. Therefore, when an occupant seated on the seat surface in a regular posture is present, in relation to the occupant, an entire portion from a thigh to a knee of the occupant can be effectively lifted in the vicinity of the thighs closer to the buttocks of the occupant, thereby improving the waist restraining performance of an occupant.

The occupant protecting device according to another aspect of the present invention is an occupant protecting device provided inside or below a seat cushion of a vehicle seat, including: an airbag cushion capable of expanding and deploying to push up a seat surface of the seat cushion; an inflator that supplies gas for expansion and deployment into the airbag cushion in the event of a vehicle emergency; and a cover that covers at least a portion of the airbag cushion; wherein the airbag cushion has at least one first attaching point attached to the vehicle seat side, at least one second attaching point attached to the vehicle seat side on a rearward side of the first attaching point in a front-rear direction of the vehicle seat, and an expanding and deploying part that at least expands and deploys between the at least one first attaching point and the at least one second attaching point due to gas from the inflator, and the cover can guide the expansion and deployment direction of the expanding and deploying part in a process of expansion and deployment of the expanding and deploying part.

According to this aspect, the cover directs the expansion and deployment direction of the expanding and deploying part toward a prescribed direction. For example, if the expansion and deployment direction is toward an upward side and the rearward side of the vehicle seat in the front-rear direction, the expanding and deploying part can be more greatly expanded and deployed upward from the rearward side thereof than the forward side thereof, as described above. Therefore, similarly to the above, the waist restraining performance of an occupant can be improved.

DESCRIPTION OF THE PREFERRED EMBODIMENTS

Embodiment 1

An occupant protecting device according to a preferred Embodiment 1 of the present invention will be described with reference to the accompanying drawings. In the present document, up and down, left and right, and front and rear are defined as follows. When an occupant is seated in a seat (vehicle seat) in a regular posture, a direction the occupant faces is referred to as the front, a opposite direction is referred to as the rear, and a direction indicating a coordinate axis is referred to as a front-rear direction. Furthermore, when the occupant is seated in the vehicle seat in a regular posture, the right of the occupant is referred to as a right direction, the left of the occupant is referred to as a left direction, and a direction indicating a coordinate axis is referred to as a left-right direction. Similarly, when the occupant is seated in a regular posture, a head direction of the occupant is referred to as up, a waist direction of the occupant is referred to as down, and a direction indicating a coordinate axis is referred to as an up-down direction.

Vehicle Seat 100

Figure 1A:
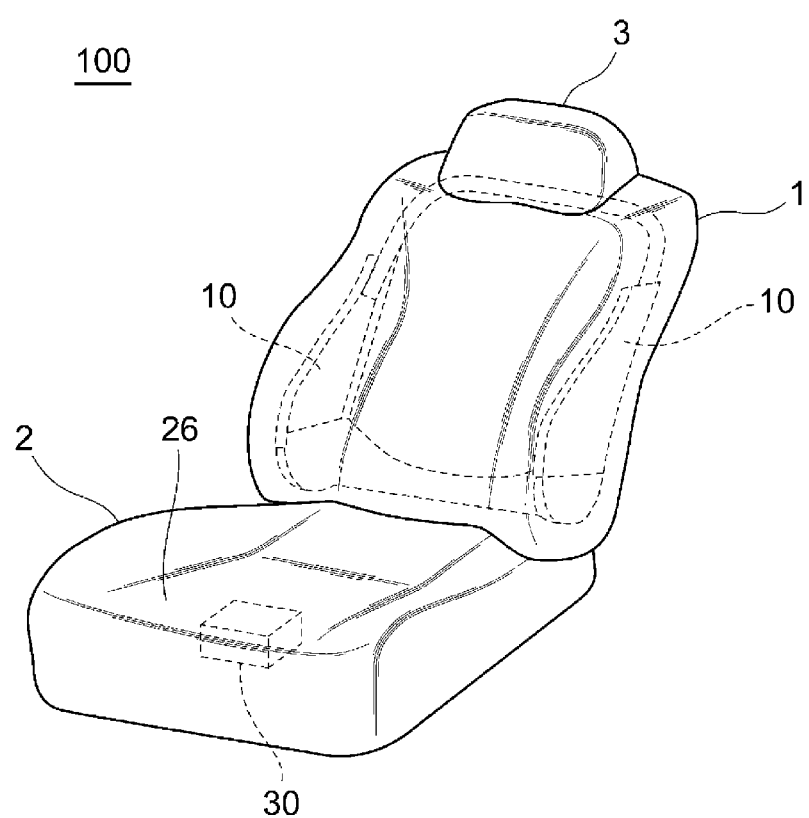
FIG. 1A is a perspective view illustrating an external shape of a vehicle seat provided with an occupant protecting device according to Embodiment 1.

First, with reference to FIGS. 1A and 1B, a configuration of a vehicle seat 100 of Embodiment 1 will be described. As illustrated in FIG. 1A, the vehicle seat 100 is provided with a seatback 1 that supports the back of an occupant, a seat cushion 2 on which the occupant sits, and a headrest 3 that supports the head of the occupant. The vehicle seat 100 is, for example, a driver seat or passenger seat, but may be a rear seat.

Figure 1B:
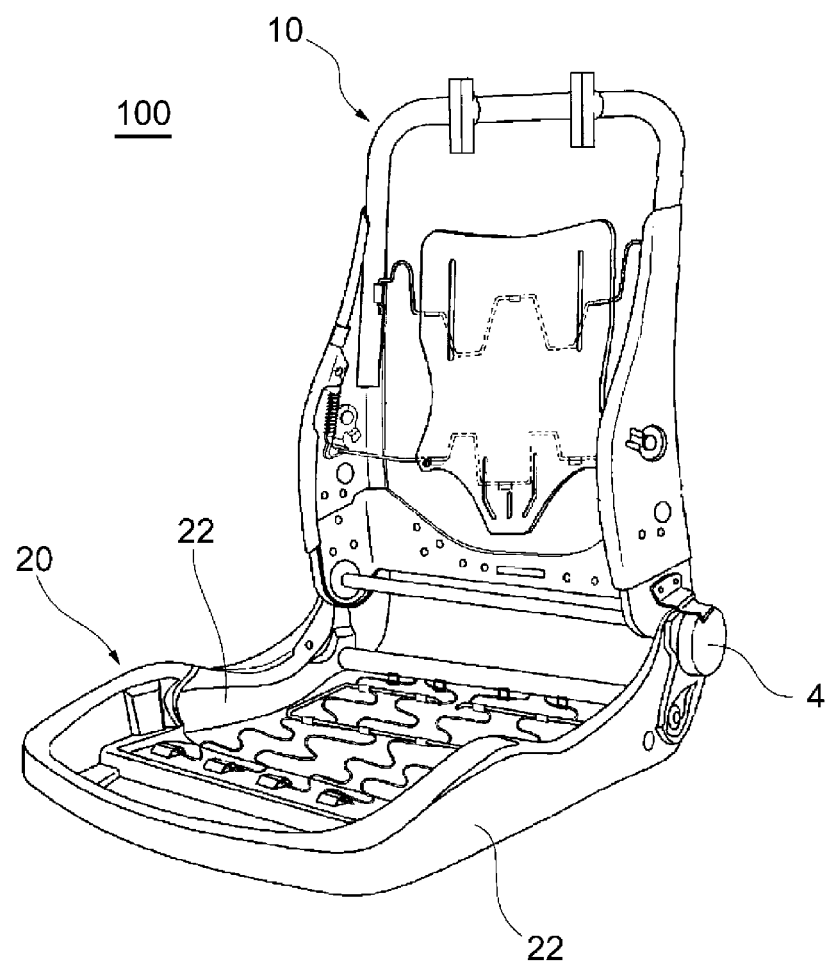
FIG. 1B is a perspective view illustrating a frame structure inside the vehicle seat of FIG. 1.

As illustrated in FIG. 1B, a seat frame 10 and a seating frame 20, which form a framework of the seat, are provided inside the seatback 1 and the seat cushion 2, respectively. The seat frame 10 and the seating frame 20 are obtained by processing a metal component or hard resin, and are mutually connected via a reclining mechanism 4. The seating frame 20 has a pair of side frames 22, 22 spaced apart on the left and right, and a seat pan 24 (see FIGS. 3 and 8A) is bridged between the pair of side frames 22, 22.

The seat cushion 2 has, for example, a seat pad made of a urethane foam material or the like covering a surface and perimeter of the seating frame 20, and a seat cover made of leather, fabric or the like covering a surface of the seat pad. An upper surface of the seat cover configures a surface on which the occupant sits, in other words, a seat surface 26 of the seat cushion 2.

Occupant Protecting Device 30

Figure 2A:
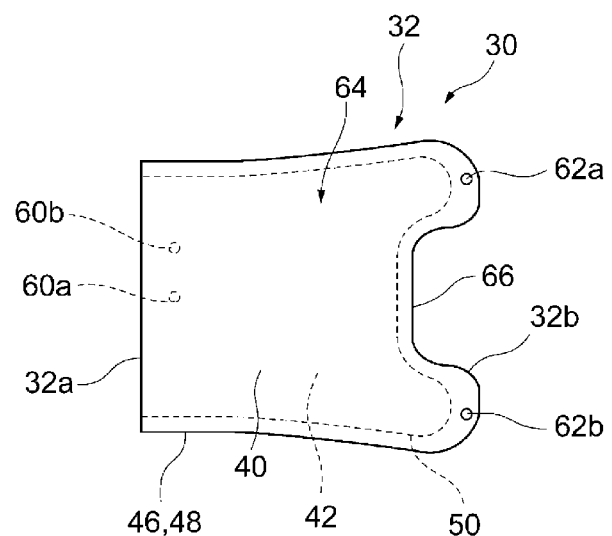
FIG. 2A is a plan view illustrating a condition in which an airbag cushion of the occupant protecting device according to the Embodiment 1 after stitching is flatly spread out.

Next, with reference to FIGS. 2A to 5, a configuration of an occupant protecting device 30 will be described. In the following description, a condition in which the components of the occupant protecting device 30 (airbag cushion 32, inflator 34, and cover 200 to be described later) are assembled to form the occupant protecting device 30 may be referred to as an "assembled state". In FIG. 2A, the inflator 34 and cover 200 are omitted.

The occupant protecting device 30 is provided inside or below the seat cushion 2 (see FIG. 1A). For example, the occupant protecting device 30 is provided inside the seat cushion 2 and is covered by the seat cover. In this case, the occupant protecting device 30 may be provided on an upper surface of the seat pan 24. Alternatively, if the seat pan 24 is not provided, placing in the seating frame 20 is possible. In another example, the occupant protecting device 30 is provided below the seat cushion 2 instead of inside the seat cushion 2. In this case, for example, the occupant protecting device 30 is mounted on a bracket secured to the vehicle seat 100 below the seat cushion 2. Hereinafter, an example in which the occupant protecting device 30 is provided on the upper surface of the seat pan 24 will be described.

Figure 5:
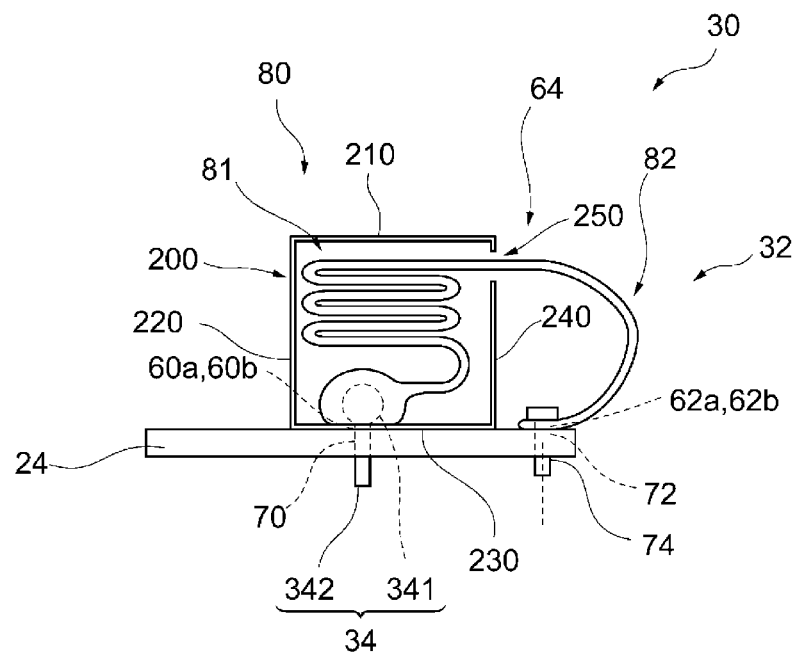
FIG. 5 is a schematic longitudinal cross-sectional view illustrating a condition of the cover covering the airbag cushion of FIG. 2A after attaching to the seat pan of the vehicle seat and after folding.

As illustrated in FIGS. 2A and 5, the occupant protecting device 30 contains: an expandable and deployable airbag cushion 32; an inflator 34 that supplies gas for expansion and deployment inside the airbag cushion 32 in the event of a vehicle emergency; and a cover 200 that covers at least a portion of the airbag cushion 32 and is capable of being cleaved open by the expansion and deployment of the airbag cushion 32. An example of a vehicle emergency is a frontal collision of a vehicle.

The inflator 34 is electrically connected to a vehicle side ECU. For example, the inflator 34 receives a signal that an impact upon a frontal collision of the vehicle has been detected from the vehicle side ECU and operates to instantly supply the gas to the airbag cushion 32. The inflator 34 can be one of various types of inflators, such as inflators filled with a gas generating agent, compressed gas, or both, and the like.

Furthermore, the inflator 34 has: an inflator main body 341 in which at least a portion is internally provided inside the airbag cushion 32; and a stud bolt 342 extending from the inflator main body 341. In one example, the inflator main body 341 can have an ignition device attached to an open end portion of a cylindrical body having a bottom and a gas generating agent inside the cylindrical body. A plurality of ejection holes are formed on a peripheral surface of the cylindrical body, and the plurality of ejection holes are positioned inside the airbag cushion 32. The stud bolt 342 is provided so as to extend from the inside of the airbag cushion 32 to the outside and is fastened and secured to the seat pan 24 of the vehicle seat 100 by a nut on the outside of the airbag cushion 32. As described below, the airbag cushion 32, along with the cover 200, is attached to the vehicle seat 100 side (specifically, the seat pan 24) via the stud bolt 342.

Furthermore, in the event of a vehicle emergency, the gas generating agent in the inflator body 341 is ignited by the ignition device of the inflator main body 341. Gas is then generated, and gas for expansion and deployment is supplied into the airbag cushion 32 through the plurality of ejection holes in the inflator main body 341.

Figure 2B:
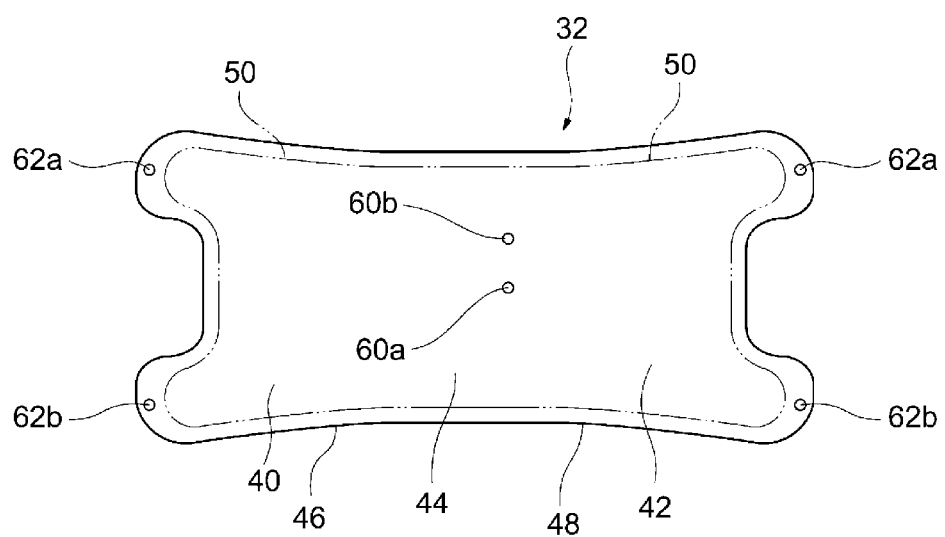
FIG. 2B is a plan view illustrating a condition in which an airbag cushion of the occupant protecting device according to the Embodiment 1 before stitching is flatly spread out.

The airbag cushion 32 is a bag body and expands and deploys by receiving the supply of gas from the inflator 34. The airbag cushion 32 is formed, for example, by stitching or adhering one or a plurality of pieces of base materials or the like at appropriate positions. By way of a preferred example, the airbag cushion 32 is formed by stitching together a front base material 40 and a back base material 42. In this formation, first, as illustrated in FIG. 2B, one piece of a base material 44 is folded at the center in a longitudinal direction thereof, and the folded portions are overlapped with each other as illustrated in FIG. 2A. Furthermore, for the front base material 40, which is an upward side portion of the overlap, and the back base material 42, which is a lower side portion, respective peripheral edge portions 46, 48 are stitched together at a seam 50. Thereby, an air chamber (bag) is delineated between the front base material 40 and the back base material 42, on an inner side from the seam 50. Gas from the inflator 34 is supplied to the air chamber, such that a chamber delineating portion of the front and back base materials 40, 42 expands and deploys.

The airbag cushion 32 has: two front attaching points 60a, 60b (first attaching points); two rear attaching points 62a, 62b (second attaching points) provided on a rearward side of the two front attaching points 60a, 60b in the front-rear direction of the vehicle seat 100; and an expanding and deploying part 64 that at least expands and deploys between the front attaching points 60a, 60b and the rear attaching points 62a, 62b by gas from the inflator 34. The front attaching points 60a, 60b and the rear attaching points 62a, 62b are attached to prescribed positions on the vehicle seat 100 side. The expanding and deploying part 64 is a portion that delineates the air chamber described above. In other words, the expanding and deploying part 64 is configured from portions of the front base material 40 and the back base material 42 on an inner side from the seam 50.

The front attaching points 60a, 60b are provided in a vicinity of a front end portion 32a of the airbag cushion 32 and are spaced apart from each other in the left-right direction. Herein, the front attaching point 60a is provided in a vicinity of a center portion of the front end portion 32a of the airbag cushion 32, and the front attaching point 60b is provided at a position displaced in the left-right direction from the vicinity of the center portion. The front attaching points 60a, 60b are, for example, holes through which a fastener is used, and are formed in the back base material 42 at a pre-stitching stage illustrated in FIG. 2B. Furthermore, the front attaching points 60a, 60b are positioned on an inner side from the seam 50. However, in another embodiment, the front attaching points 60a, 60b may be positioned on an outer side from the seam 50.

The front attaching points 60a, 60b may also serve as attaching points for attaching the inflator 34 to the vehicle seat 100. For example, an axial direction of the inflator main body 341 is aligned with the left-right direction, and the cylindrical body is stored inside the airbag cushion 32. Furthermore, a stud bolt 342 protrudes to an outer side from the airbag cushion 32 (below the back base material 42) and is fastened and secured to the seat pan 24 by nuts. Thereby, the inflator 34 and the airbag cushion 32 are co-fastened to the seat pan 24 by the stud bolts 342 and nuts. The co-fastened points configure the front attaching points 60a, 60b for attaching the airbag cushion 32 to the vehicle seat 100 and configure an attaching point for attaching the inflator 34 to the vehicle seat 100.

The rear attaching points 62a, 62b are provided in a vicinity of a rear end portion 32b of the airbag cushion 32 and are spaced apart from each other in the left-right direction. The rear attaching points 62a, 62b are, for example, holes through which a fastener is used, and are formed at each corner portion of the front base material 40 and the back base material 42 in the pre-stitching stage illustrated in FIG. 2B. Furthermore, the rear attaching points 62a, 62b are positioned on an outer side from the seam 50. Therefore, the rear attaching points 62a, 62b are provided on a non-expanding portion of the airbag cushion 32, not on the expanding and deploying part 64.

The airbag cushion 32 has a recessed part 66 between the rear attaching points 62a, 62b. The recessed part 66 is an empty space formed to extend toward the expanding and deploying part 64 when the airbag cushion 32 is viewed from the rear. From another perspective, the recessed part 66 is formed, and therefore, the rear attaching points 62a, 62b of the airbag cushion 32 protrude toward the rear of the airbag cushion 32. The recessed part 66 is formed in a center portion of the rear end portion 32b of the airbag cushion 32. The length of the recessed part 66 in the front-rear direction is, for example, approximately ¼ of the length connecting the front end portion 32a and the rear end portion 32b of the airbag cushion 32.

In an assembled state, the expanding and deploying part 64 has a folding portion 80 between the front attaching points 60a, 60b and the rear attaching points 62a, 62b. In other words, a portion of the expanding and deploying part 64 positioned between the front attaching points 60a, 60b and the rear attaching points 62a, 62b is folded to mutually overlay in the up-down direction. Furthermore, there may be one or a plurality of these folded portions. In other words, the folding portion 80 may have one or more folded portions. In one preferred example, as illustrated in FIG. 5, the folding portion 80 has a first folding portion 81 (first portion) and a second folding portion 82 (second portion) on a rearward side from the first folding portion 81 in the front-rear direction of the vehicle seat. In the folding portion 80, the first folding portion 81 is formed on the front attaching points 60a, 60b side, and the second folding portion 82 is formed on the rear attaching points 62a, 62b side. The first folding portion 81 has a greater number of bellows-shaped folds that are stacked in the up-down direction than the second folding portion 82. Herein, the first folding portion 81 is folded a plurality of times to have a plurality of fold-back points, while the second folding portion 82 is folded once to have one fold-back point.

The cover 200 is, for example, a soft cover and can guide the expansion and deployment direction of the expanding and deploying part 64 in a process of expansion and deployment of the expanding and deploying part 64. The cover 200 is formed, for example, by resin, fabric, other composite materials, and the like. Furthermore, the cover 200 has a weak portion 250 that serves as a starting point when cleaved open by expansion and deployment of the airbag cushion 32. The weak portion 250 is a portion that is more prone to cleaving open than other portions of the cover 200. The weak portion 250 may be, for example, an opening portion in the cover 200 that is open, a slit formed in the cover 200, or a thin-wall portion of the cover 200 that is thinner than other portions. Furthermore, if the weak portion 250 is an opening portion or slit, the weak portion 250 causes at least a portion of the airbag cushion 32 to be open.

Figure 3:
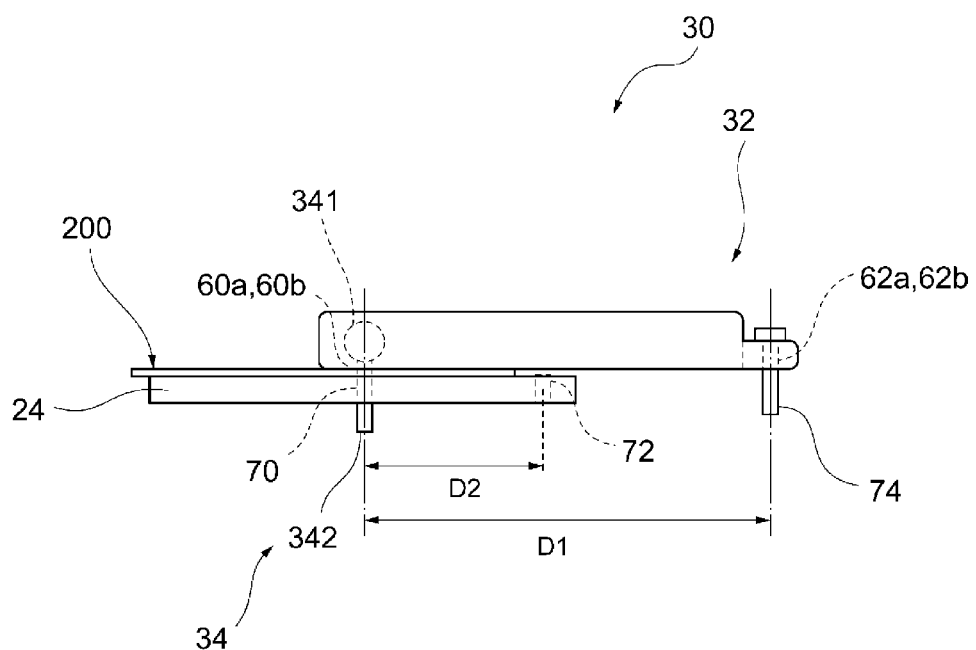
FIG. 3 is a side surface view illustrating a condition in which the airbag cushion and cover of FIG. 2A are flatly spread out after attaching to a seat pan of the vehicle seat.

Herein, a case where the weak portion 250 is an opening portion is described. In one preferred example, the cover 200 includes a single resin film that has an abbreviated rectangular shape in a flatly spread out state prior to assembly, as illustrated in FIG. 3. In the assembled state, the cover 200 is shaped to cover a portion of the airbag cushion 32 (e.g., bag-shaped), as illustrated in FIG. 5. In one example, the cover 200 is attached to the seat pan 24 of the vehicle seat 100 via the stud bolt 341 along with the airbag cushion 32 at the same points as the front attaching points 60a, 60b.

However, in another embodiment, the cover 200 may be attached to the vehicle seat 100 together with or separately from the airbag cushion 32 in the vicinity of the front attaching points 60a, 60b.

Furthermore, the cover 200 covers the front attaching points 60a, 60b side of the expanding and deploying part 64, such that the weak portion 250 is positioned on a rearward side in a front-rear direction of the vehicle seat 100. In this case, the cover 200 covers at least the front portion of the folding portion 80 of the expanding and deploying part 64 in the front-rear direction of the vehicle seat 100. Specifically, the cover 200 covers the first folding portion 81 of the folding portion 80 from the forward side and upward side. Therefore, the first folding portion 81 of the folded portion 80 is enclosed by the cover 200 on a forward side portion and upward side portion thereof.

On the other hand, the weak portion 250 of the cover 200 has at least a portion on the side of the rear attaching points 62a, 62b of the airbag cushion 32 that is open. In one example, the cover 200 covers a side on the front attaching points 60a, 60b side of the expanding and deploying part 64 such that the weak portion 250 is positioned on the upward side of the expanding and deploying part 64. In this case, the weak portion 250 is an opening portion formed by two ends of the cover 200 that are separated from each other, as illustrated in FIG. 5. In other words, when the cover 200 is assembled or folded back to cover a portion of the airbag cushion 32, the two ends of the cover 200 are close and face each other in the front-rear direction with a gap therebetween. This gap (opening portion) is the weak portion 250.

Furthermore, the cover 200 exposes the second folding portion 82 (rear portion of the folding portion 80) to the outside of the cover 200 through the weak portion 250. In another embodiment, if the folding portion 80 has the first folding portion 81 but a portion corresponding to the second folding portion 82 is not folded, the cover 200 may have an unfolded portion that is open via the weak portion 250. Furthermore, in another embodiment, the cover 200 may cause a portion included in the rear attaching points 62a, 62b positioned across a recessed part 66 to open via the weak portion 250.

Furthermore, in terms of the configuration of the cover 200 in the assembled state, it can be said that the cover 200 has a first cover portion 210, a second cover portion 220, a third cover portion 230, and a fourth cover portion 240 that cover the first folding portion 81 from an upward side, forward side, lower side, and rearward side, respectively. The end portions of the first cover portion 210 and the fourth cover portion 240 are pulled apart from each other by expansion and deployment of the airbag cushion 32. In other words, the end portion of the first cover portion 210 and the end portion of the fourth cover portion 240 configure the weak portion 250 therebetween. The end portions of the first cover portion 210 and the fourth cover portion 240, which configure the weak portion 250, are connected by, for example, stitching, adhering, or the like, prior to the airbag cushion 32 being expanded and deployed, and this connection is eliminated by expansion and deployment of the airbag cushion 23. During expansion and deployment of the airbag cushion 32, in the cover 200, the weak portion 250 cleaves open before other portions of the cover 200.

The weak portion 250 is positioned above the center portion of the rear end portion 32b of the airbag cushion 32, i.e., above the recessed part 66 (see FIG. 2a and FIG. 5). Therefore, the cover 200 is configured such that the upward side and rearward side portions open up by expansion and deployment of the airbag cushion 32, starting from the weak portion 250.

In another embodiment, the weak portion 250 may be formed as a slit in the cover 200, as described above. Such a slit can be formed, for example, in the first cover portion 210 or the fourth cover portion 240. The shape, size and range of the slit can be appropriately designed. When the weak portion 250 is an opening portion, the position of the slit (e.g., each position in the front-rear direction and up-down direction) can be set in the same manner as the position of the opening portion, and the cover 200 causes at least a portion of the side of the rear attaching points 62a, 62b of the airbag cushion 32 to be open via the slit as the weak portion 250.

Furthermore, in another embodiment, the weak portion 250 may be formed as a thin-wall portion in the cover 200, as described above. Such a thin-wall portion can be formed, for example, by reducing the wall thickness of a portion of the first cover portion 210 or the fourth cover portion 240 more than other portions of the cover 200. When the weak portion 250 is an opening portion, the position of the thin-wall portion (e.g., each position in the front-rear direction and up-down direction) can be set in the same manner as the position of the opening portion. When the weak portion 250 is a thin wall portion, the cover 200 can cover not only a portion but also the entirety of the airbag cushion 32.

Assembly of Occupant Protecting Device 30

In assembling the occupant protecting device 30, the airbag cushion 32 is first attached to the seat pan 24 along with the cover 200 at the front attaching points 60a, 60b. Next, the airbag cushion 32 is attached to the seat pan 24 at the rear attaching points 62a, 62b and then folded. Thereafter, the cover 200 covers a portion of the folded airbag cushion 32. Hereinafter, attachment of the airbag cushion 32 and the cover 200 on the seat pan 24 is described in detail.

Figure 4:
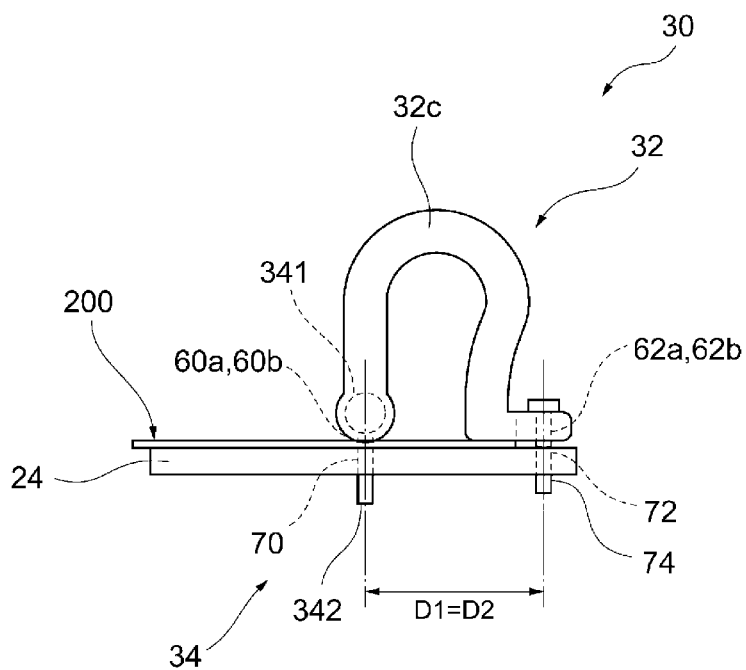
FIG. 4 is a side surface view illustrating a condition of the airbag cushion of FIG. 2A after attaching to the seat pan of the vehicle seat and prior to folding and a condition of a flatly spread out cover.

As illustrated in FIGS. 3 to 5, the seat pan 24 is provided with a front securing position 70 (first securing position) for attaching the front attaching points 60a, 60b of the airbag cushion 32 and a rear securing position 72 (second securing position) for attaching the rear attaching points 62a, 62b of the airbag cushion 32. The front securing position 70 and the rear securing position 72 are, for example, positions of securing holes formed in the seat pan 24. Note that in relation to an occupant seated in a regular posture, the rear securing position 72 goes below a portion of a thigh of the occupant near the buttocks.

FIG. 3 illustrates a condition in which the airbag cushion 32 and cover 200 are flatly spread out prior to attaching to the seat pan 24. In this condition, a distance D1 between the front attaching points 60a, 60b and the rear attaching points 62a, 62b is longer than a distance D2 between the front securing position 70 and the rear securing position 72 (D1>D2). Note that the distances D1 and D2 refer to lengths in the front-rear direction. The distance D1 is, for example, 39.5 cm, and the distance D2 is, for example, 6.5 cm.

FIG. 4 illustrates a condition of the airbag cushion 32 before folding and the flatly spread-out cover 200, after the airbag cushion 32 and cover 200 are attached together to the seat pan 24. When attaching to the seat pan 24, the front attaching points 60a, 60b are attached to the front securing position 70, for example, via the stud bolt 342 of the inflator 34, and the rear attaching points 62a, 62b are attached to the rear securing position 72, for example, via a fastener 74 such as a bolt, rivet, or the like. In this case, the cover 200 (e.g., third cover portion 230) and the airbag cushion 32 are attached together to the seat pan 24 at the front attaching points 60a, 60b.

In this attached condition, the distance D1 is reduced and becomes equal to the distance D2. Therefore, the airbag cushion 32 will have a slack 32c between the front attaching points 60a, 60b and the rear attaching points 62a, 62b. In other words, the airbag cushion 32 is attached to the upper surface of the seat pan 24 in a condition in which the slack 32c is formed on an upward side of the seat pan 24. The amount (length) of the slack 32c corresponds to the difference between the distance D1 and the distance D2 when the airbag cushion 32 is flatly spread out.

FIG. 5 illustrates a condition of the cover 200 covering the folded airbag cushion 32 after the airbag cushion 32 and cover 200 are attached to the seat pan 24. In this condition, the occupant protecting device 30 is provided on the seat pan 24. In other words, FIG. 5 illustrates a condition of the airbag cushion 32 after installation and before the expanding and deploying part 64 expands and deploys.

After installation, the airbag cushion 32 forms the folding portion 80 in the expanding and deploying part 64 by folding the slack 32c from an upward side in an accordion-like manner. In other words, the expanding and deploying part 64 has the folding portion 80 that overlaps with itself in an up-down direction by folding between the front attaching points 60a, 60b and rear attaching points 62a, 62b. The folding portion 80 has the first folding portion 81 and second folding portion 82 at front and rear positions, respectively.

Herein, the first folding portion 81 is positioned on the side of the front attaching points 60a, 60b, specifically, on an upward side of the front attaching points 60a, 60b or in the vicinity of the front attaching points 60a, 60b. The second folding portion 82 is positioned on the side of the rear attaching points 62a, 62b, specifically, on an upward side of the rear attaching points 62a, 62b or in the vicinity of the rear attaching points 62a, 62b.

Furthermore, with regard to the folded airbag cushion 32, the cover 200 covers the first folding portion 81 of the airbag cushion 32 and partially encloses the airbag cushion 32. The enclosing is performed by deforming the cover 200 from a flat state. For example, the first cover portion 210, second cover portion 220, and third cover portion 230 of the cover 200 cover a lower side, forward side, and upward side of the first folding portion 81, and then the fourth cover portion 240 covers the first folding portion 81 from the rearward side. At this time, the first cover portion 210 and fourth cover portion 240 are connected by stitching, adhering, or the like, such that the weak portion 250 is positioned on an upward side of the recessed part 66 of the airbag cushion 32.

Expanded and Deployed State of Airbag Cushion 32

Figure 6:
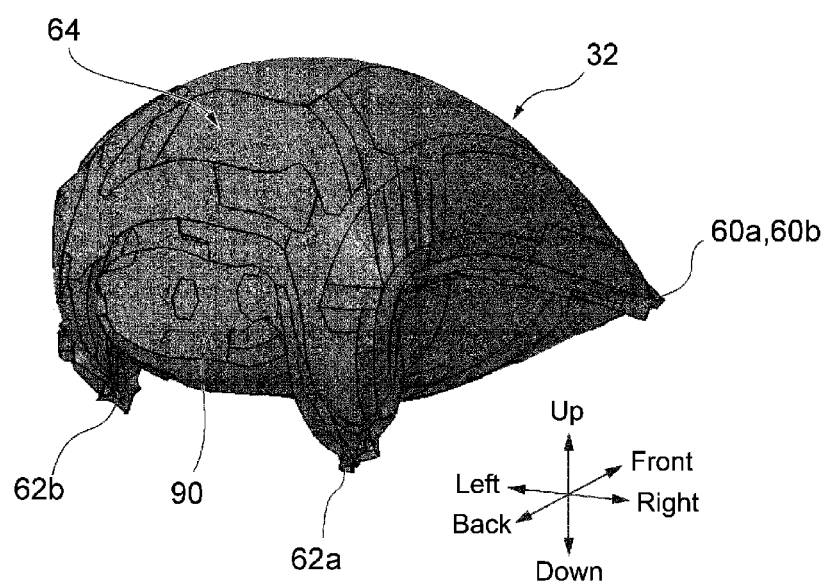
FIG. 6 is a perspective view illustrating the airbag cushion of FIG. 2A after expanding and deploying.

FIG. 6 illustrates the airbag cushion 32 after expanding and deploying. In FIG. 6, the cover 200 is omitted. The expanding and deploying part 64 of the airbag cushion 32 expands and deploys between the front attaching points 60a, 60b and the rear attaching points 62a, 62b, and also expands and deploys up to a position beyond the front attaching points 60a, 60b and the rear attaching points 62a and 62b in the front-rear direction. On the other hand, during the expansion and deployment, the cover 200 can guide the expansion and deployment direction of the expanding and deploying part 64.

Specifically, the slack 32c during attachment is present, and therefore, the expanding and deploying part 64 has an increased expansion between the front attaching points 60a, 60b and the rear attaching points 62a, 62b. In this case, the expansion and deployment of the expanding and deploying part 64 of the airbag cushion 32 causes the cover 200 to pull apart the first cover portion 210 and the fourth cover portion 240 and to cleave open, starting at the weak portion 250 on the upward side and rearward side. Therefore, the expanding and deploying part 64 begins to expand and deploy to the upward side and rearward side between the front attaching points 60a, 60b and the rear attaching points 62a, 62b. In the expanded and deployed condition, a portion of the expanding and deploying part 64 (for example, the folding portion 80) that overlapped prior to expansion and deployment is eliminated. Furthermore, in the expanded and deployed airbag cushion 32, a space portion 90, which is recessed when viewed from the rear side, is formed on a rear portion of the airbag cushion 32. The space portion 90 is formed at a point corresponding to the recess part 66 of the airbag cushion 32, and is formed in the up-down direction between upper and lower surfaces of the airbag cushion 32.

Operation of Occupant Protecting Device 30 in Event of Vehicle Emergency

Figure 7A:
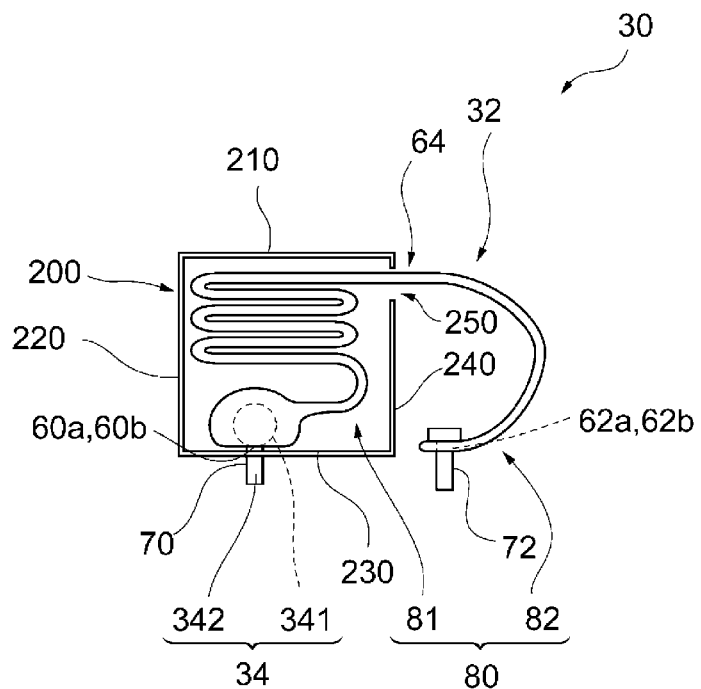
FIG. 7A is a schematic longitudinal cross-sectional view illustrating a condition of the occupant protecting device according to Embodiment 1 before the airbag cushion expands and deploys.
Figure 7B:
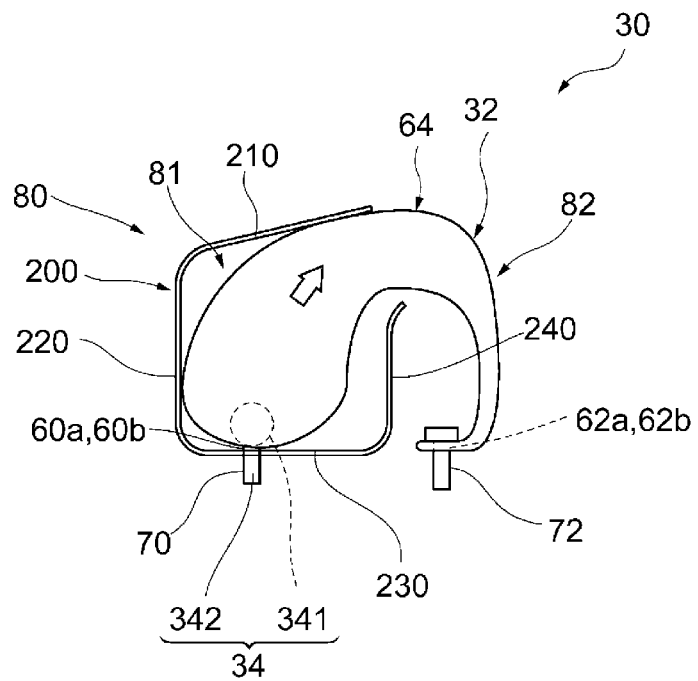
FIG. 7B is a schematic longitudinal cross-sectional view illustrating a condition of the occupant protecting device according to Embodiment 1 in the process of expansion and deployment of the airbag cushion.
Figure 7C:
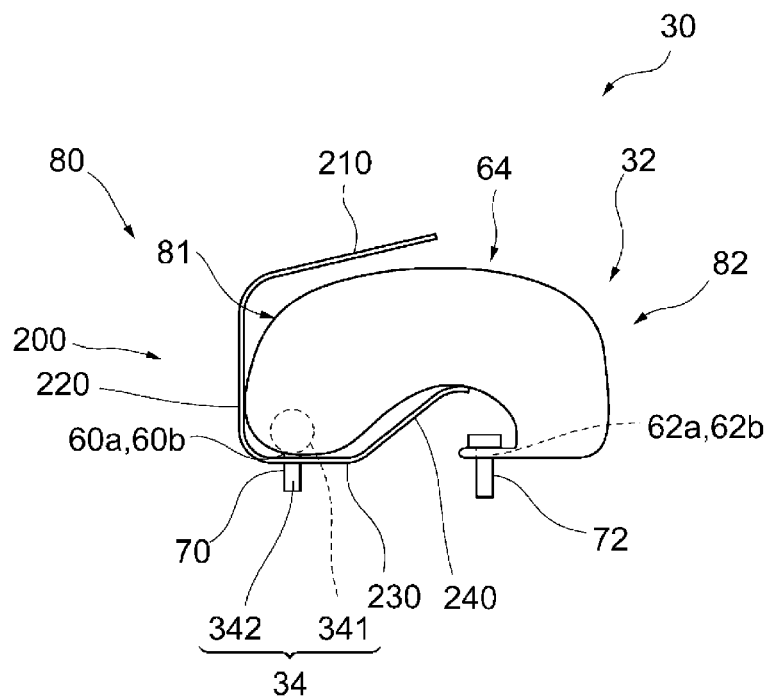
FIG. 7C is a schematic longitudinal cross-sectional view illustrating a condition of the occupant protecting device according to Embodiment 1 after the airbag cushion expands and deploys.
Figure 12A:
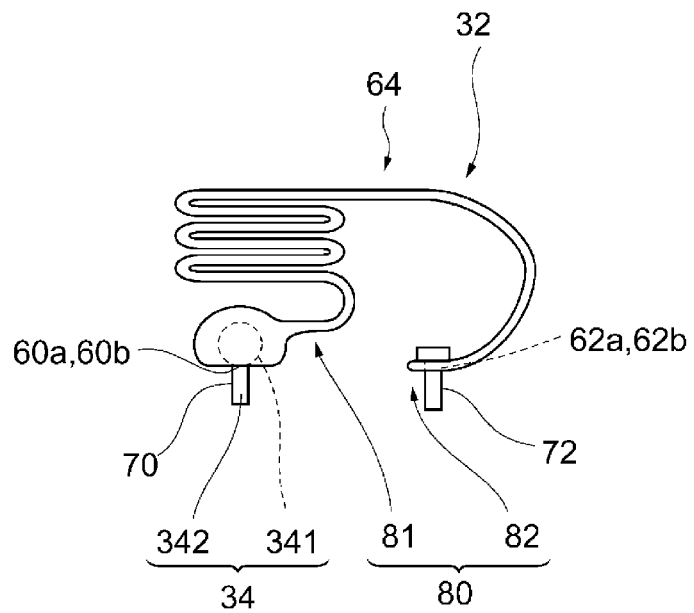
FIG. 12A is a schematic longitudinal cross-sectional view illustrating a condition of the occupant protecting device according to a comparative example before the airbag cushion expands and deploys.
Figure 12B:
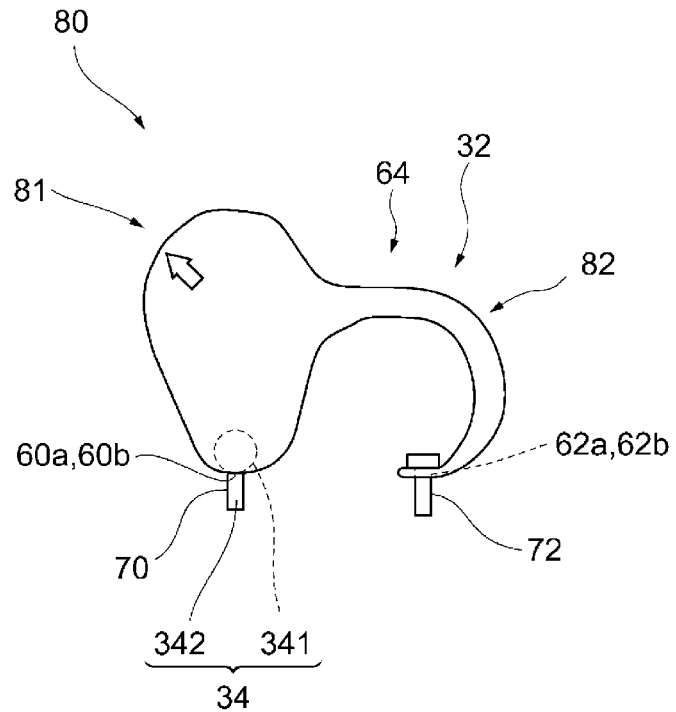
FIG. 12B is a schematic longitudinal cross-sectional view illustrating a condition of the occupant protecting device according to a comparative example in the process of expansion and deployment of the airbag cushion.
Figure 12C:
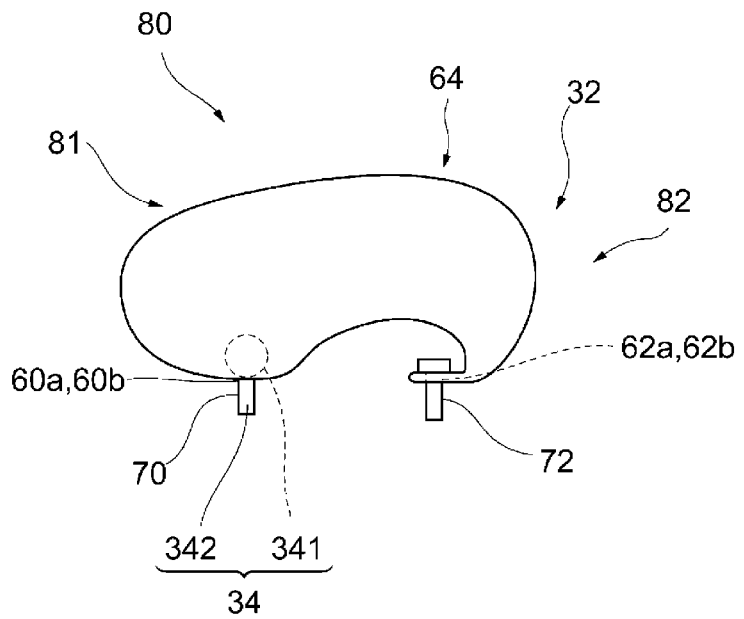
FIG. 12C is a schematic longitudinal cross-sectional view illustrating a condition of the occupant protecting device according to a comparative example after the airbag cushion expands and deploys.

Next, with reference to FIGS. 7A to 7C, an operation of the occupant protecting device 30 in a vehicle emergency is described in comparison with an occupant protecting device according to a comparative example illustrated in FIGS. 12A to 12C.

In a state prior to expansion and deployment illustrated in FIG. 7A, in the event of a vehicle emergency, the expanding and deploying part 64 of the airbag cushion 32, which receives a gas supply from the inflator 34, instantly begins to expand and deploy.

As illustrated in FIG. 7B, when gas begins to be supplied, the gas flows into the first folding portion 81 and second folding portion 82 of the expanding and deploying part 64 in sequence, and both begin to expand and deploy. At this time, the first folding portion 81, which is covered by the cover 200, begins to expand and deploy while being suppressed from expanding and deploying by the cover 200. On the other hand, the second folding portion 82, which is exposed and not covered by the cover 200, begins to expand and deploy without being suppressed from expanding and deploying by the cover 200. In other words, in an initial stage of expansion and deployment, the second folding portion 82 (rear portion of the expanding and deploying part 64) expands and deploys prior to the first folding portion 81 (front portion of the expanding and deploying part 64).

Furthermore, as expansion and deployment progresses, the expansion and deployment of the expanding and deploying part 64 pulls apart the connection between the first cover portion 210 and the fourth cover portion 240 of the cover 200, causing the weak portion 250 to cleave open. Thereafter, the expanding and deploying part 64 continues to expand and deploy significantly to the upward side and rearward side from the cleaved-open portion. At this time, expansion and deployment of the expanding and deploying part 64 to the forward side and upward side continues to be suppressed by the cover 200 (see FIG. 7B). In other words, even in the initial and advanced stages of expansion and deployment, the rear portion of the expanding and deploying part 64 expands and deploys prior to the front portion of the expanding and deploying part 64.

Note that after the cover 200 is cleaved opened, the first cover portion 210 of the cover 200 is inclined by the expanding and deploying part 64 such that the rearward side end portion thereof faces to the upward side. Such an inclination allows the supplied gas to flow more obliquely to the upward side, i.e., toward the upward side and rearward side, which can promote expansion and deployment of the expanding and deploying part 64 to the upward side and rearward side.

FIG. 7C illustrates a condition of the occupant protecting device 30 after expansion and deployment of the airbag cushion 32. In this case, sufficient gas is supplied into the airbag cushion 32, and the expanding and deploying part 64 is fully expanded and deployed such that the rearward side is sufficiently higher to the upward side than the forward side. Note that this condition is illustrated in FIG. 6 described above.

On the other hand, the occupant protecting device according to the comparative example illustrated in FIGS. 12A to 12C does not have the cover 200 according to Embodiment 1. Therefore, in an initial stage of expansion and deployment, unlike Embodiment 1, the first folding portion 81 (front portion of the expanding and deploying part 64) expands and deploys prior to the second folding portion 82 (rear portion of the expanding and deploying part 64) (see FIG. 12B). This is due to the fact that the expansion and deployment of the first folding portion 81 is not suppressed due to the absence of the cover 200. Furthermore, even in the initial and advanced stages of expansion and deployment, the front portion of the expanding and deploying part 64 expands and deploys prior to the rear portion of the expanding and deploying part 64 (see FIG. 12B). In other words, the expanding and deploying part 64 begins to expand and deploy toward the forward side rather than the rearward side, and the forward side continues to expand and deploy to a greater extent than the rearward side.

As a result, the condition of the airbag cushion 32 after expansion and deployment illustrated in FIG. 12C is different from the condition in Embodiment 1 (see FIG. 7C). Specifically, the airbag cushion 32 according to Embodiment 1 is higher on the upward side and expands longer in the rearward side than the occupant protecting device according to the comparative example.

Effect of Occupant Protecting Device 30 on Occupant

Next, the effects of the occupant protecting device 30 according to Embodiment 1 on an occupant are described below with reference to FIG. 8A and FIG. 8B.

Figure 8A:
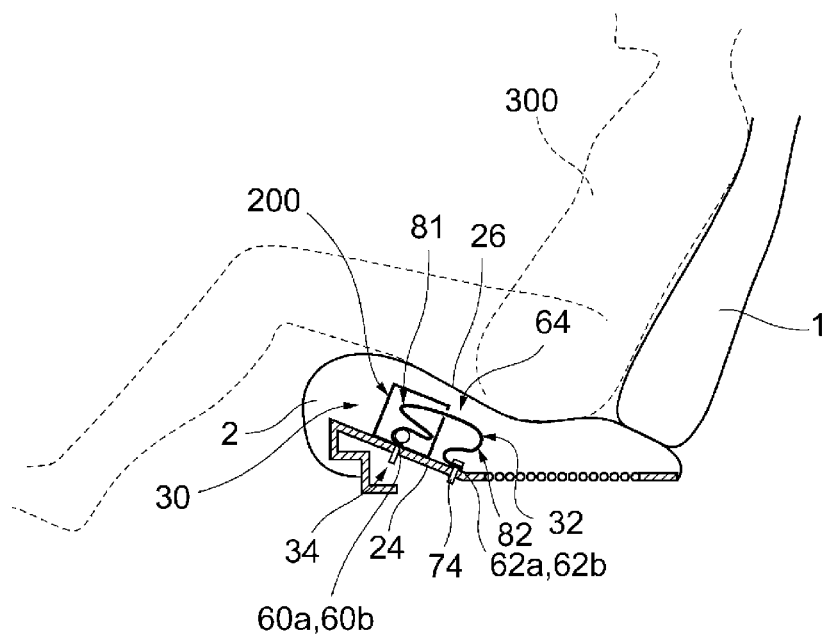
FIG. 8A is a longitudinal cross-sectional view illustrating a condition of the occupant protecting device according to Embodiment 1 installed on the seat pan of the vehicle seat, before the airbag cushion expands and deploys.
Figure 8B:
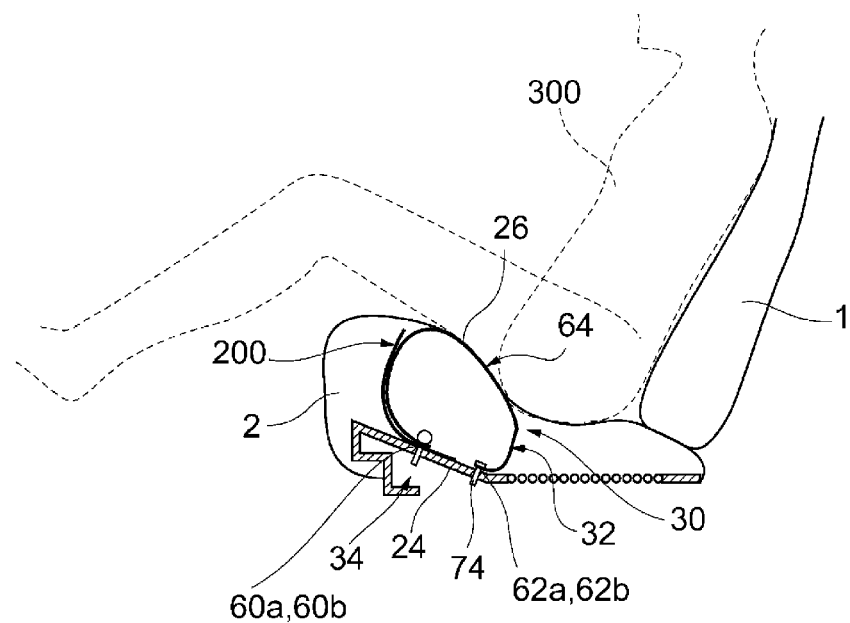
FIG. 8B is a longitudinal cross-sectional view illustrating a condition of the occupant protecting device according to Embodiment 1 installed on the seat pan of the vehicle seat, after the airbag cushion expands and deploys.

FIGS. 8A and 8B are schematic longitudinal cross-sectional views illustrating the occupant protecting device 30 installed on the seat pan 24. FIG. 8A illustrates a condition before expansion and deployment (the same condition as the occupant protecting device 30 illustrated in FIG. 7A), and FIG. 8B illustrates a condition after expansion and deployment (the same condition as the occupant protecting device 30 illustrated in FIG. 7C). Furthermore, FIGS. 8A and 8B schematically illustrate an occupant 300 seated on the seat surface 26 in a regular posture. The airbag cushion 32 is attached to the seat pan 24 such that the rear attaching points 62a, 62b are at a position below a thigh of the occupant 300 near the buttocks.

As the airbag cushion 32 expands and deploys, the seat surface 26 of the seat cushion 2 is pushed upward. At this time, the airbag cushion 32 expands to the upward side and rearward side as described above (see FIG. 7C), effectively pushing up a vicinity of the thigh of the occupant 300 near the buttocks and effectively lifting up a portion from the thigh to the knee of the occupant 300 as a whole. This lifting up of the thigh is more effective than that of the occupant protecting device 30 according to the comparative example illustrated in FIGS. 12A to 12C. This is because, as described above, in the present embodiment, the rear portion of the expanding and deploying part 64 expands prior to the front portion of the expanding and deploying part 64, both in the initial and subsequent advanced stages of expansion and deployment, and expands higher on the upward side and longer on the rearward side than in the comparative example. In this manner, effective lifting of the knees of the occupant 300 is achieved, and forward movement of the waist of the occupant 300 is suppressed.

According to Embodiment 1 described above, the weak portion 250 of the cover 200 is positioned on the rearward side in the front-rear direction, and the cover 200 covers the side of the front attaching points 60a, 60b of the expanding and deploying part 64 and is attached to the vehicle seat 100 on the side of the front attaching points 60a, 60b. This allows the waist restraining performance of the occupant 300 to be further improved, because in the process of expansion and deployment of the expanding and deploying part 64 of the airbag cushion 32 in the event of a vehicle emergency, the expanding and deploying part 64 expands and deploys upward from the rearward side thereof to a greater extent than from the forward side.

In particular, the cover 200 is configured to cleave open with the weak portion 250 as a starting point due to expansion and deployment of the expanding and deploying part 64, and therefore, on the upward side and rearward side, the expanding and deploying part 64 can be expanded and deployed to a greater extent upward from the rearward side thereof than from the forward side. Furthermore, the cover 200 is configured to cover the front portion of the folding portion 80 (first folding portion 81) of the expanding and deploying part 64, and therefore, expansion and deployment from the rear portion of the folding portion 80 (second folding portion 82) can take priority over the expansion and deployment of the front portion. Furthermore, with this configuration, the cover 200 is configured to cover the front portion of the folding portion 80 (first folding portion 81) of the expanding and deploying part 64 from the upward side and forward side, and therefore, expansion and deployment from the rear portion of the folding portion 80 can effectively take priority over the expansion and deployment of the front portion. Furthermore, the cover 200 is configured to cover the front portion of the folding portion 80 (first folding portion 81), which has a greater number of folds in a bellows shape so as to be stacked in the up-down direction, thereby making it easier to expand and deploy the expanding and deploying part 64 from the rearward side portion.

Furthermore, the cover 200 is attached to the vehicle seat 100 along with the airbag cushion 32 at the same location as the airbag cushion 32. Therefore, installation work is easier and the configuration of the occupant protecting device 30 is simplified. Furthermore, the stud bolt 342 of the inflator 34 can also be effectively used at this time.

Embodiment 2

Referring to FIGS. 9 to 11A, a configuration of the occupant protecting device 30 according to Embodiment 2 is described. A difference between Embodiment 2 and Embodiment 1 is the structure of the cover. The following description focuses on differing points.

Figure 9:
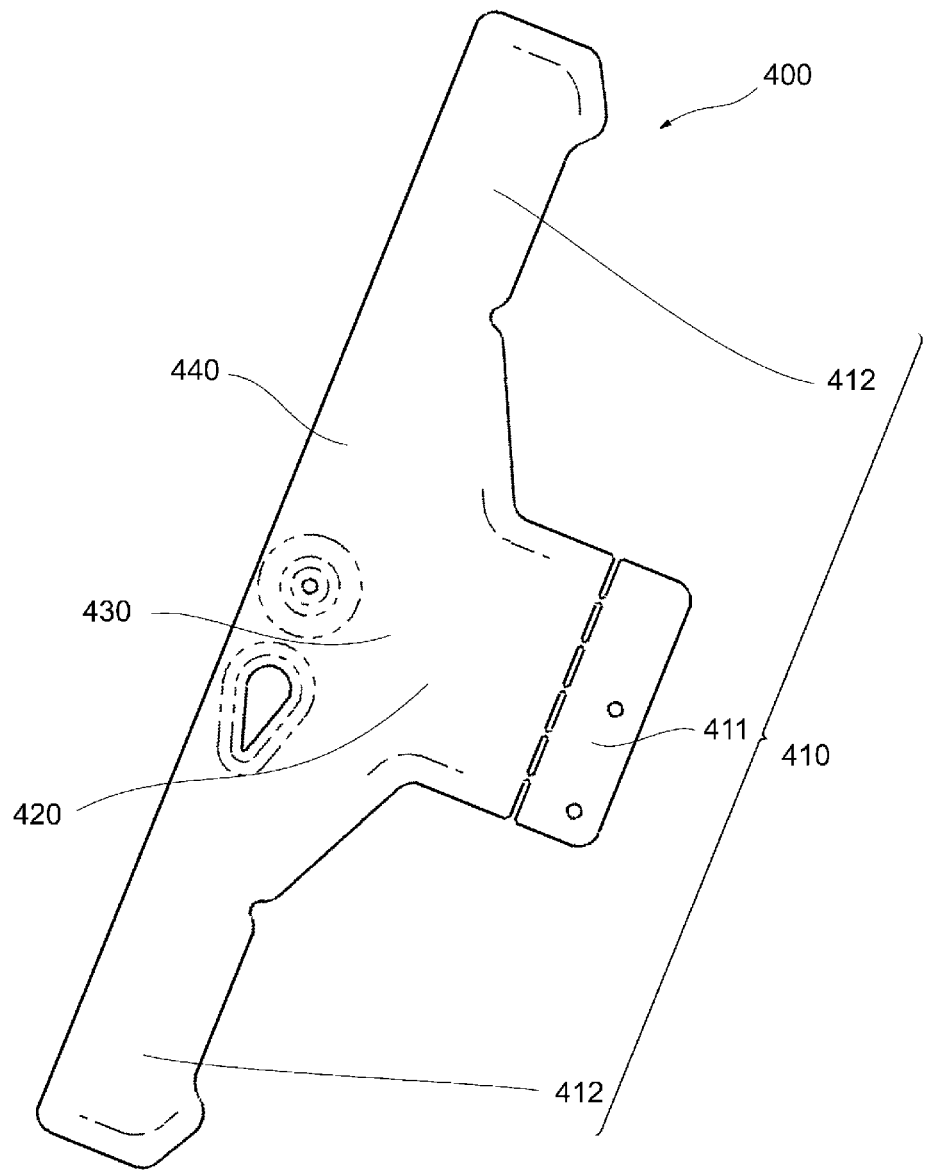
FIG. 9 is a plan view illustrating a condition in which a cover of the occupant protecting device according to Embodiment 2 is flatly spread out.
Figure 11A:
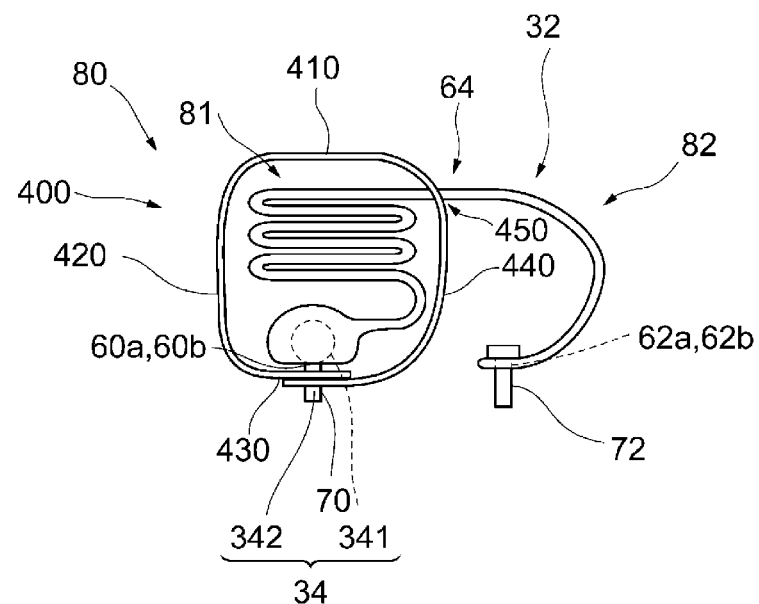
FIG. 11A is a schematic longitudinal cross-sectional view illustrating a condition of the occupant protecting device according to Embodiment 2 before the airbag cushion expands and deploys.

As illustrated in FIG. 9, the cover 400 according to Embodiment 2 includes an abbreviated triangular flattened form in the pre-assembled state. The cover 400 is formed, for example, by a composite material of resin and fabric. The cover 400 has a first cover portion 410 covering the airbag cushion 32 from the upward side, a second cover portion 420 covering the airbag cushion 32 from the forward side, a third cover portion 430 covering the airbag cushion 32 from the lower side, and a fourth cover portion 440 covering the airbag cushion 32 from the rearward side (see: FIG. 11A). Furthermore, the cover 400, in an assembled state, has a weak portion 450 that serves as a starting point for cleaving open, between the first cover portion 410 and the fourth cover portion 440 (see: FIG. 11A). The first cover portion 410 has a center portion 411 and two fold-back portions 412 on both sides of the center portion 411.

Figure 10A:
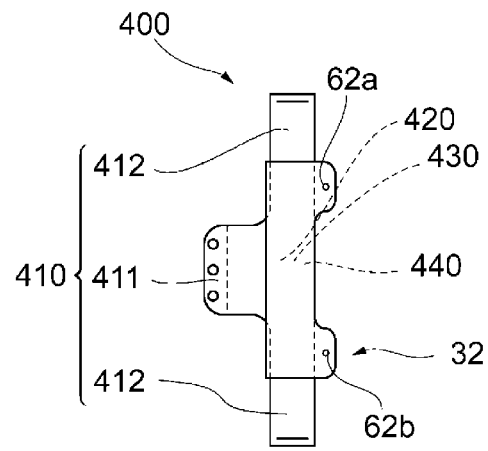
FIG. 10A is a schematic plan view illustrating a condition in which an airbag cushion is placed above the cover according to Embodiment 2.
Figure 10B:
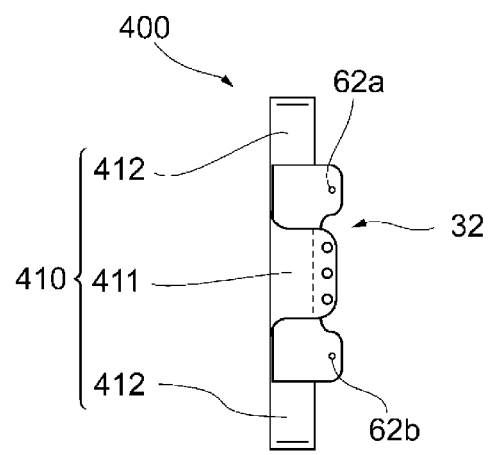
FIG. 10B is a schematic plan view illustrating a condition in which the cover according to Embodiment 2 covers a portion of the airbag cushion.
Figure 10C:
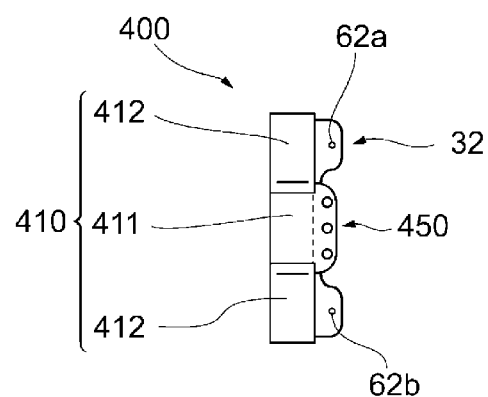
FIG. 10C is a schematic plan view illustrating a condition in which the cover according to Embodiment 2 wraps around the airbag cushion.

The cover 400 is configured to cover a portion of the airbag cushion 32 before attaching to the seat pan 24. For example, as illustrated in FIG. 10A, the folded airbag cushion 32 with the inflator 34 included inside is placed on the third cover portion 430 of the cover 400. Next, as illustrated in FIG. 10B, the second cover portion 420, the center portion 411 of the first cover portion 410, and the fourth cover portion 440 of the cover 400 are wrapped around an outer perimeter of the airbag cushion 32. Furthermore, the center portion 411 of the first cover portion 410 and the fourth cover portion 440 are then connected by stitching, adhering, or the like. Thereafter, as illustrated in FIG. 10C, the two fold-back portions 412 of the first cover portion 410 are folded back toward the center portion 411 of the first cover portion 410 to cover a portion not rolled in a longitudinal direction of the folded airbag cushion 32 and are connected to the center portion 411 by stitching, adhering, or the like. Thus, a unit is formed that includes the cover 400 and the airbag cushion 32 covered by the cover 400. Furthermore, the unit is attached to the seat pan 24. Also in this case, the cover 400 is attached to the seat pan 24 at the front attaching points 60a, 60b along with the airbag cushion 32 via the stud bolt 342 of the inflator 34 (see FIG. 11A).

As illustrated in FIG. 11A, the cover 400 in this unitized state covers the side of the front attaching points 60a, 60b of the expanding and deploying part 64, with at least a portion on the side of the rear attaching points 62a, 62b of the airbag cushion 32 open, via the weak portion 450. Specifically, as with the cover 200 of Embodiment 1, the cover 400 is opened such that the portion configuring the rear attaching points 62a, 62b, positioned across the recessed part 66, is exposed to the outside of the cover 400 through the weak portion 450. In this case, the cover 400 wraps around a remaining portion of the expanding and deploying part 64, excluding the open portion. The weak portion 450 is mainly configured between the first cover portion 410 and the fourth cover portion 440. Specifically, the weak portion 450 is configured by the opening portion between the center portion 411 of the first cover portion 410 and the fourth cover portion 440 (herein, connected by stitching, adhering, or the like as described above).

Figure 11B:
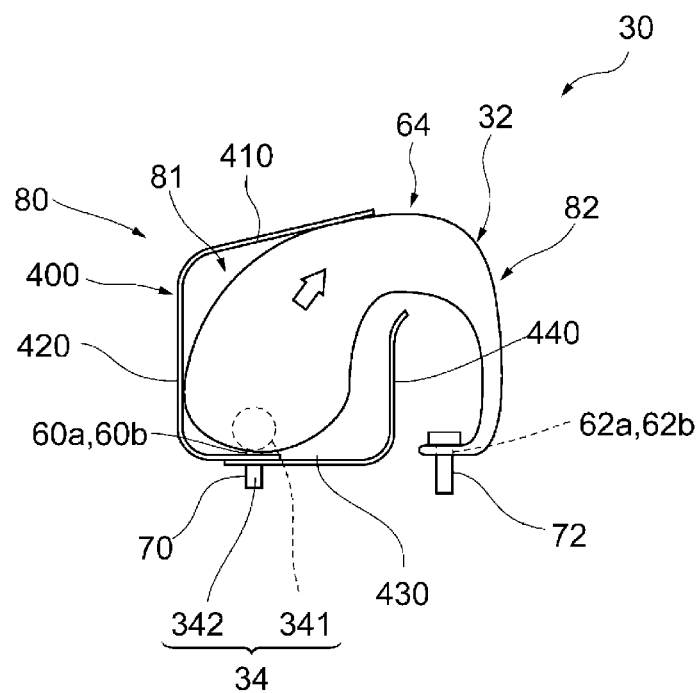
FIG. 11B is a schematic longitudinal cross-sectional view illustrating a condition of the occupant protecting device according to Embodiment 2 in the process of expansion and deployment of the airbag cushion.
Figure 11C:
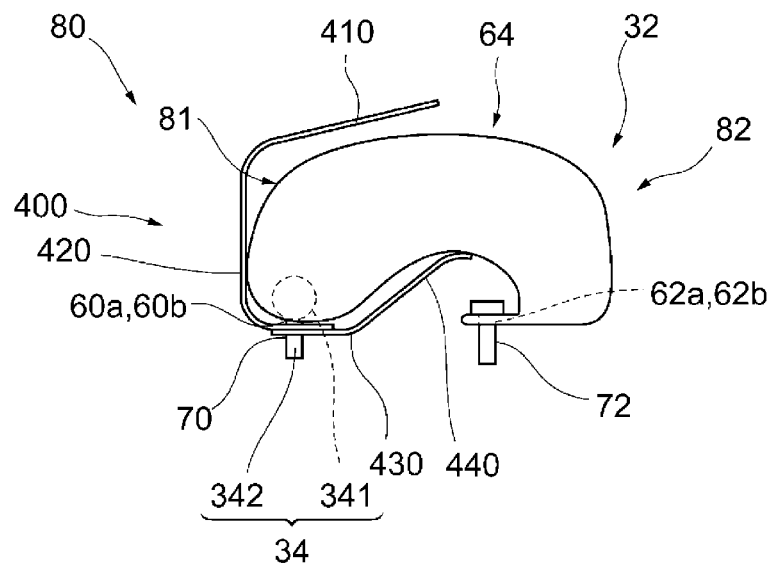
FIG. 11C is a schematic longitudinal cross-sectional view illustrating a condition of the occupant protecting device according to Embodiment 2 after the airbag cushion expands and deploys.

FIGS. 11A to 11C are diagrams illustrating Embodiment 2 according to the occupant protecting device 30 in the event of a vehicle emergency. In the present embodiment, similar to Embodiment 1, when gas begins to be supplied to the airbag cushion 32 in the event of a vehicle emergency, the gas flows into the first folding portion 81 and second folding portion 82 of the expanding and deploying part 64 in sequence, and both begin to expand and deploy. At this time, the portion covered by the cover 400 (first folding portion 81) begins to expand and deploy while being suppressed by the cover 400, while the portion exposed without being covered by the cover 400 (second folding portion 82) begins to expand and deploy without being suppressed by the cover 400. In other words, in the initial stage of expansion and deployment, the rear portion of the expanding and deploying part 64 expands and deploys prior to the front portion of the expanding and deploying part 64.

Furthermore, as expansion and deployment progresses, the expansion and deployment of the expanding and deploying part 64 causes the cover 400 to cleave open starting from the weak portion 450 on the upward side and rearward side. For example, the cover 400 is pulled apart at the connection point between the first cover portion 410 and the fourth cover portion 440 (weak portion 450), such that the expanding and deploying part 64 continues to expand and deploy significantly to the upward side and rearward side from the cleaved-open portion (weak portion 450). At this time, the connection point between the two fold-back portions 412 and the center portion 411 of the first cover portion 410 are also pulled apart. Expansion and development of the expanding and deploying part 64 to the forward side and upward side is suppressed by the cover 400. Thus, the rear portion of the expanding and deploying part 64 expands and deploys with priority to the front portion of the expanding and deploying part 64, even in the initial and advanced stages of expansion and development.

Therefore, in the present embodiment, similar to Embodiment 1, the vicinity of the thigh of the occupant 300 near the buttocks is effectively pushed up and the portion from the thigh to a knee of the occupant 300 is effectively lifted up as a whole, which can be effective in improving the waist restraining performance of the occupant 300.

Modified Example

The embodiments described above are for ease of understanding of the present invention and are not intended to be construed as limiting the present invention. Elements included in the embodiments, as well as arrangements, materials, conditions, shapes, sizes and the like thereof, are not limited to those exemplified, but rather can be appropriately changed.

For example, the covers 200 and 400 may have other specifications, and portions that cover the airbag cushions 32 may be different. In one example, the cover 200 may not have the fourth cover portion 240 and may fully open to the rearward side of the folded airbag cushion 32. In this case, the cover may be configured to cover a portion of the airbag cushion 32, such as by being folded back at a center portion thereof or the like. Specifically, when the cover is in a flatly spread out state, a front portion in the front-rear direction is folded back toward the rearward side, the folded-back portion is overlapped with a portion on a lower side thereof, and a peripheral edge portion of these overlapped portions are connected by stitching, adhering, or the like to each other. As a result, the cover includes the first cover portion 210, second cover portion 220, and third cover portion 230 that cover the front portion of the expanding and deploying part 64 from the upward side, forward side, and lower side thereof, respectively, while the rearward side of the expanding and deploying part 64 is fully open.

Furthermore, the slack 32c may be folded in a form other than an accordion shape. Furthermore, the slack 32c may be folded in steps in the front-rear direction. Thereby, the expanding and deploying part 64 also has portions that overlap each other in the up-down direction by being folded between the front attaching points 60a, 60b and the rear attaching points 62a, 62b, and a folding portion for forming the overlap in the up-down direction. In another example, the slack 32c may be folded into a roll shape. In this case, the expanding and deploying part 64 has a site that overlaps itself in an up-down direction by folding between the front attaching points 60a, 60b and rear attaching points 62a, 62b. Furthermore, in another example, the slack 32c can be folded in a form that combines at least two of the accordion shape, step shape and roll shapes.

Furthermore, the number of the front attaching points 60a, 60b may be one or may be three or more. Similarly, the number of the rear attaching points 62a, 62b may be one or may be three or more. If there are three or more rear attaching points, the recessed part 66 is preferably provided between rear attaching points that are adjacent to each other. Furthermore, the front attaching point does not have to also serve as an attaching point for the inflator 34. Furthermore, the airbag cushion 32 may be an OPW airbag.

EXPLANATION OF CODES

1 . . . Seatback, 10 . . . Seat frame, 2 . . . Seat cushion, 20 . . . Seating frame, 3 . . . Headrest, 4 . . . Reclining mechanism, 22 . . . Side frame, 24 . . . Seat pan, 26 . . . Seat surface, 30 . . . Occupant protecting device, 32 . . . Airbag cushion, 32a . . . Front end portion, 32b . . . Rear end portion, 32c . . . Slack, 34 . . . Inflator, 341 . . . Inflator main body, 342 . . . Stud bolt, 40 . . . Front base material, 42 . . . Back base material, 44 . . . . Base material, 46, 48 . . . Peripheral edge portion, 50 . . . Seam, 60a, 60b . . . Front attaching point, 62a, 62b . . . Rear attaching point, 64 . . . Expanding and deploying part, 66 . . . Recessed part, 70 . . . Front securing position, 72 . . . Rear securing position, 74 . . . Fastener, 80 . . . Folding portion, 81 . . . First folding portion (first portion), 82 . . . Second folding portion (second portion), 90 . . . Void portion, 100 . . . Vehicle seat, 200 . . . Cover, 210 . . . First cover portion, 220 . . . Second cover portion, 230 . . . Third cover portion, 240 . . . Fourth cover portion, 250 . . . Weak portion, 300 . . . Occupant, 320 . . . Airbag cushion, 400 . . . Cover, 410 . . . First cover portion, 411 . . . Center portion, 412 . . . Fold-back portion, 420 . . . Second cover portion, 430 . . . Third cover portion, 440 . . . Fourth cover portion, 450 . . . Weak portion, D1, D2 . . . Distance

The invention claimed is:

1. An occupant protecting device provided inside or below a seat cushion of a vehicle seat, comprising:
an airbag cushion capable of expanding and deploying to push up a seat surface of the seat cushion;
an inflator that supplies gas for expansion and deployment into the airbag cushion in the event of a vehicle emergency; and
a cover that covers at least a portion of the airbag cushion and is capable of being cleaved open by the expansion and deployment of the airbag cushion; wherein
the airbag cushion has at least one first attaching point attached to a vehicle seat side, at least one second attaching point attached to the vehicle seat side on a rearward side of the first attaching point in a front-rear direction of the vehicle seat, an expanding and deploying part that at least expands and deploys between the at least one first attaching point and the at least one second attaching point due to gas from the inflator,
the cover has a weak portion that serves as a starting point for when the cover is cleaved open by the expansion and deployment of the airbag cushion, and
the cover covers a side of the at least one first attaching point of the expanding and deploying part, such that the weak portion is positioned on a rearward side in the front-rear direction, and is attached to the vehicle seat on the side of the at least one first attaching point.

2. The occupant protecting device according to claim 1, wherein the cover covers the side of the at least one first attaching point of the expanding and deploying part, such that the weak portion is positioned on an upward side of the expanding and deploying part.

3. The occupant protecting device according to claim 1, wherein the weak portion is an opened opening portion of the cover.

4. The occupant protecting device according to claim 3, wherein the weak portion is made into a condition in which at least a portion on the side of the at least one second attaching point of the airbag cushion is opened.

5. The occupant protecting device according to claim 1, wherein the weak portion is a slit formed in the cover.

6. The occupant protecting device according to claim 1, wherein the weak portion is a thin wall portion formed into a thinner wall than another portion of the cover.

7. The occupant protecting device according to claim 1, wherein the expanding and deploying part has a folding portion between the at least one first attaching point and the at least one second attaching point, and
the cover covers a front portion of the airbag cushion in the front-rear direction.

8. The occupant protecting device according to claim 7, wherein
the folding portion has a first portion and a second portion that is on a rearward side of the first portion in the front-rear direction of the vehicle seat,
the first portion has a greater number of folded bellows shapes that are stacked in an up-down direction than the second portion, and
the cover covers the first portion of the folding portion.

9. The occupant protecting device according to claim 8, wherein the cover has a first cover portion that covers the first portion of the folding portion from an upward side.

10. The occupant protecting device according to claim 7, wherein the cover has a second cover portion that covers the folding portion from a forward side of the vehicle seat in the front-rear direction.

11. The occupant protecting device according to claim 1, wherein the cover is attached to the vehicle seat along with the airbag cushion at the same location as the at least one first attaching point.

12. The occupant protecting device according to claim 11, wherein the inflator has an inflator main body in which at least a portion is internally provided in the airbag cushion, and a stud bolt extending from the inflator main body, and
the cover and airbag cushion are attached to the vehicle seat via the stud bolt.

13. The occupant protecting device according to claim 1, wherein the airbag cushion further has a non-expanding and deploying part that does not expand and deploy, and
the at least one second attaching point is provided on the non-expanding and deploying part.

14. An occupant protecting device provided inside or below a seat cushion of a vehicle seat, comprising:
an airbag cushion capable of expanding and deploying to push up a seat surface of the seat cushion;
an inflator that supplies gas for expansion and deployment into the airbag cushion in the event of a vehicle emergency; and
a cover that covers at least a portion of the airbag cushion; wherein
the airbag cushion has at least one first attaching point attached to a vehicle seat side, at least one second attaching point attached to the vehicle seat side on a rearward side of the first attaching point in a front-rear direction of the vehicle seat, and an expanding and deploying part that at least expands and deploys between the at least one first attaching point and the at least one second attaching point due to gas from the inflator,
the cover is attached to the vehicle seat at the at least one first attaching point; and
the cover can guide the expansion and deployment direction of the expanding and deploying part in a process of expansion and deployment of the expanding and deploying part.

15. The occupant protecting device according to claim 14, wherein the cover can guide the expansion and deployment direction of the expanding and deploying part so as to face to an upward side and to a rearward side of the vehicle seat in a front-rear direction.

16. The occupant protecting device according to claim 14, wherein the inflator is attached to the vehicle seat at the at least one first attaching point.

17. The occupant protecting device according to claim 14, wherein the airbag cushion further has a non-expanding and deploying part that does not expand and deploy, and
the at least one second attaching point is provided on the non-expanding and deploying part.

18. The occupant protecting device according to claim 14, wherein the cover covers a front portion of the airbag cushion attached to the at least one first attaching point.

19. The occupant protecting device according to claim 18, wherein the cover has a first cover portion that covers a first portion of a folding portion of the airbag cushion from an upward side and a second cover portion that covers the folding portion from a forward side of the vehicle seat in the front-rear direction.

20. The occupant protecting device according to claim 18, wherein a front portion of the airbag cushion includes a folding portion including folded bellows shapes stacked in an up-down direction.

* * * * *